(12) United States Patent
Braasch et al.

(10) Patent No.: US 12,546,311 B2
(45) Date of Patent: Feb. 10, 2026

(54) PUMP-MOTOR UNIT COMPRISING A CENTRED STATOR

(71) Applicant: Schwäbische Hüttenwerke Automotive GmbH, Aalen (DE)

(72) Inventors: Holger Braasch, Pfullendorf (DE); Thomas Finsterle, Ravensburg (DE)

(73) Assignee: SCHWÄBISCHE HÜTTENWERKE AUTOMOTIVE GMBH, Aalen (DE)

( * ) Notice: Subject to any disclaimer, the term of this patent is extended or adjusted under 35 U.S.C. 154(b) by 126 days.

(21) Appl. No.: 17/987,169

(22) Filed: Nov. 15, 2022

(65) Prior Publication Data

US 2023/0151811 A1     May 18, 2023

(30) Foreign Application Priority Data

Nov. 18, 2021 (DE) ...................... 10 2021 130 216.1

(51) Int. Cl.
   *F04C 2/10*        (2006.01)
   *F04C 15/00*     (2006.01)
   *H02K 5/04*      (2006.01)

(52) U.S. Cl.
CPC ............ *F04C 2/102* (2013.01); *F04C 15/008* (2013.01); *F04C 15/00* (2013.01); *F04C 2240/30* (2013.01); *F04C 2240/40* (2013.01); *H02K 5/04* (2013.01)

(58) Field of Classification Search
CPC ............ F04C 2/084; F04C 2/10; F04C 2/102; F04C 11/008; F04C 15/00; F04C 15/008;
(Continued)

(56) References Cited

U.S. PATENT DOCUMENTS 3,875,436 A     4/1975   MacFarland
9,695,691 B2 *   7/2017   Shimaguchi ............ F01C 21/10
(Continued)

FOREIGN PATENT DOCUMENTS

DE     102019127055 A1 *   4/2020               H02K 1/12
DE     102020112594 A1 *   11/2021
(Continued)

OTHER PUBLICATIONS

Types of Fit: Clearance Fit, Transition Fit, and Interference Fit—from https://themechanicalengineering.com/types-of-fit/ (Year: 2021).*
(Continued)

*Primary Examiner* — Essama Omgba
*Assistant Examiner* — Joseph S. Herrmann
(74) *Attorney, Agent, or Firm* — Buchanan Ingersoll & Rooney PC (57) ABSTRACT

A pump-motor unit includes: a housing structure; an impeller for delivering a fluid; an electric drive motor accommodated in the motor space and including a rotor coupled to the impeller in order to rotationally drive it and a stator with a stator centring structure. The housing structure includes a pump space portion, a motor space portion, a housing centring portion axially between the pump space portion and the motor space portion, and a motor space opening on an end-facing side, through which the rotor and the stator can be axially inserted into the motor space. The housing centring portion encloses the stator centring structure in order to centre the stator.

19 Claims, 3 Drawing Sheets

(58) Field of Classification Search
CPC .............. F04C 2240/30; F04C 2240/40; F04C 2240/50; H02K 5/04; H02K 5/06; H02K 5/08
See application file for complete search history.

(56) References Cited

U.S. PATENT DOCUMENTS

| | | | |
|---|---|---|---|
| 2003/0070879 A1* | 4/2003 | Pringle | F04C 15/008 184/6.28 |
| 2014/0079578 A1* | 3/2014 | Irie | F04D 13/0693 417/423.14 |
| 2014/0167559 A1* | 6/2014 | Eike | H02K 15/00 310/216.131 |
| 2016/0285324 A1* | 9/2016 | Carrasco | H02K 1/185 |
| 2016/0377082 A1 | 12/2016 | Fecke et al. | |
| 2019/0082917 A1* | 3/2019 | Shiozawa | H02K 1/148 |

FOREIGN PATENT DOCUMENTS

| | | | |
|---|---|---|---|
| DE | 102020112596 A1 | * | 11/2021 |
| EP | 3087277 B1 | | 11/2016 |
| JP | 2007331428 A | * | 12/2007 |
| WO | 2015197161 A1 | | 12/2015 |
| WO | 2020098494 A1 | | 5/2020 |
| WO | WO-2021144117 A1 | * | 7/2021 ............ F04C 11/008 |

OTHER PUBLICATIONS

German Search Report issued in German Patent Application No. 10 2021 130 216.1, mailed Aug. 23, 2022, 9 pages. (English translation).

Extended European Search Report for European Application No. 22205901.6, dated Apr. 12, 2023 with translation, 12 pages.

* cited by examiner

PUMP-MOTOR UNIT COMPRISING A CENTRED STATOR

CROSS REFERENCE TO RELATED APPLICATIONS

This application claims benefit of priority from German Patent Application No. 10 2021 130 216.1, filed Nov. 18, 2021. The contents of this application are incorporated herein by reference.

FIELD OF THE INVENTION

The invention relates to a pump-motor unit which comprises an impeller for delivering a fluid and an electric drive motor for driving the impeller, wherein the impeller and the electric motor are arranged in a common housing. The pump-motor unit can in particular be designed to deliver a hydraulic fluid, for example a transmission oil and/or a lubricating oil and/or a cooling liquid and/or a working liquid. It is preferably installed in a vehicle or designed to be installed in a vehicle. The pump-motor unit can for example be designed for use as a lubricant pump and/or coolant pump for lubricating and/or cooling a drive motor of a vehicle and/or as a transmission pump for oiling (lubricating and/or cooling and/or actuating) a vehicle transmission, for example an automatic or manual transmission, and/or designed for supplying a vehicle clutch.

The pump-motor unit is in particular suitable for lubricating and/or cooling and/or actuating a so-called e-axle of an electrified vehicle, i.e. a vehicle which is driven by an electric motor, either as a purely electric vehicle or as a hybrid vehicle. The e-axle combines an electric motor, a transmission and power electronics in one drive unit which drives the vehicle axle. The complexity of the drive is reduced, and the drive train is more compact, in particular in embodiments in which the e-axis is immovably connected to the vehicle axle.

SUMMARY OF THE INVENTION

An aspect of the invention aims to improve pump-motor units of the type mentioned, such that components of the respective pump-motor unit can be assembled easily and quickly, but still in the correct position with respect to each other, on an automated mounting machine.

The subject-matter of an aspect of the invention is a pump-motor unit which comprises a housing structure, an impeller and an electric drive motor (electric motor) for rotationally driving the impeller. The housing structure surrounds a pump space and a motor space in axial alignment with the pump space. The impeller is rotatably accommodated in the pump space in order to deliver a fluid. The electric drive motor is accommodated in the motor space and comprises a rotor, which can be rotated about a rotational axis, and a stator. The rotor and/or the stator comprises or each comprise electrical coils. Preferably, at least the stator comprises electrical coils. The pump-motor unit also comprises a drive shaft which couples the impeller to the rotor of the electric drive motor in order to rotationally drive it. The drive shaft can couple the impeller and the rotor of the drive motor indirectly, i.e. via one or more transmission members. More preferably, the drive shaft couples the impeller and the rotor directly, by non-rotatably connecting both the impeller and the rotor to the drive shaft, expediently by non-rotatably joining each of them directly to the drive shaft.

The housing structure comprises: a pump space portion which radially delineates the pump space; a motor space opening on an end-facing side; a motor space portion which radially delineates the motor space; and a housing centring portion, axially between the pump space portion and the motor space portion, which likewise radially delineates the motor space. When assembling the pump-motor unit, the rotor and the stator can be axially inserted through the motor space opening into the motor space and positioned in the motor space. The housing centring portion and the motor space portion lie axially next to each other and surround the stator. In relation to their assembly, the motor space portion lies axially upward of the housing centring portion, nearer the motor space opening.

The stator comprises a stator centring structure which is geometrically adapted to the housing centring portion in order to centre the stator in the motor space in relation to the rotational axis of the rotor in co-operation with the housing centring portion.

The motor space is constricted from the upward motor space portion to the housing centring portion. From the motor space opening to the pump space, the constriction directly adjoins the upward motor space portion and the housing centring portion directly adjoins the constriction. In order to centre the stator, the housing centring portion axially overlaps with the stator centring structure. In the region of the axial overlap, the housing centring portion surrounds the stator centring structure in a fit, such that the stator is centred in relation to the rotational axis of the rotor of the drive motor by the co-operation between the stator centring structure and the housing centring portion.

Because the motor space is constricted from the upward motor space portion to the housing centring portion, wherein the housing centring portion only surrounds an axial sub-portion of the stator and encloses said sub-portion in a fit in contact with the stator centring structure, an axial overlap is obtained which is shorter than the radial width and/or axial length of the stator and which serves the purpose of centring. Via this axial overlap, a centring inner circumference of the housing centring portion and a centring outer circumference of the stator centring structure are in a sufficiently tight fit for centring. A centring engagement obtains over the length of the axial overlap exhibiting a fit. The length of the centring engagement is preferably at most 20% or at most 10% of the axial length over which the coils of the drive motor extend. If the stator comprises coils, the length of the centring engagement is preferably at most 20% or at most 10% of the axial length over which the coils of the stator extend.

In advantageous embodiments, the housing centring portion and the stator centring structure are cylindrical over the axial length of the centring fit. In particular, they can each be circular-cylindrical over the axial length of the centring fit.

Advantageously, the housing centring portion guides the stator such that it can be shifted in a tight sliding contact in the region of the stator centring structure. The centring inner circumference of the housing centring portion and the centring outer circumference of the stator centring structure can in particular be selected in the region of the fit such that the stator and the housing structure exhibit a small clearance which is preferably tactilely imperceptible. Conversely, the fit can however also be selected such that there is a frictional fit between the housing centring portion and the stator centring structure, but one only exhibiting a small force, such that the stator can be axially moved into and out of the fit by a correspondingly small axial force.

The axial length of the overlap exhibiting the centring fit can be short and only make up a fraction of a radial width, preferably a diameter, of the centring outer circumference of the stator centring structure, as is preferred. In order to mount it, the stator is advantageously held secure against tilting in the region of the fit between the housing centring portion and the stator centring structure, if the motor space opening points upwards during mounting and the rotational axis of the rotor, which can in particular also simultaneously be a main mounting axis, is vertical. Even more preferably, the stator is held secure against tilting in the region of the fit even when the motor space opening points to the side and the rotational axis of the rotor extends horizontally or at an acute angle to the horizontal. In advantageous embodiments, the fit is sufficiently tight and the axial length of the overlap is sufficiently large, preferably just large enough, that tilting movements of the stator relative to the housing structure are counteracted to an extent which is conducive to easily mounting it. The centring fit can then in particular be axially and radially dimensioned such that when the rotational axis is horizontally aligned solely by the co-operation between the stator centring structure and the housing centring portion, the stator is held in the centred position at least when only its own weight is acting.

In advantageous embodiments, the housing centring portion and the stator centring structure overlap in the fit over an axial length of at most 10% or at most 5% of a maximum radial width of the centring outer circumference of the stator centring structure and/or less than 20% or less than 10% of an overall length of the stator as measured axially across all its parts.

Outside the fit, the stator is preferably narrower throughout than in the fit. If, in this embodiment of the stator, the inner circumference of the housing centring portion is imagined to be axially linear and to continuously extend without kinks, the virtually extended inner circumference envelops the stator and can in particular be an envelope, i.e. an envelope which abuts the centring outer circumference of the stator centring structure throughout.

The fit between the housing centring portion and the stator centring structure can be a clearance fit having at most a small clearance or a transition fit. If embodied as a transition fit, it is advantageously selected such that the stator can be moved into and out of the fit by at most a small axial force. If the housing centring portion exhibits an inner width as measured radially with respect to the rotational axis in the fit and the stator centring structure exhibits an outer width as measured radially with respect to the rotational axis in the fit, then in expedient embodiments, the inner width is greater than or equal to the outer width. Advantageously, the relationship is "inner width<1,001×outer width".

If the circumferences which are in the fit, i.e. the centring inner circumference of the housing centring portion and the centring outer circumference of the stator centring structure, are circular-cylindrical, as is preferred, the radial width is the diameter of a circle. The inner width is then the diameter of the centring inner circumference, and the outer width is the diameter of the centring outer circumference.

The housing centring portion can be produced in the fit to a tolerance position H in the range of H7 to H10 or H7 to H9 for the same nominal diameter. The stator centring structure can be produced in the fit to a tolerance position h in the range of h6 to h11 or h6 to h9.

All the details regarding fits refer to ISO 286 as current on the filing date.

The motor space preferably exhibits a cylindrical inner circumference in the region of the upward motor space portion. The cylindrical inner circumference can extend towards the pump space directly up to the constriction. The inner circumference with which the housing structure surrounds the motor space can in particular be cylindrical, preferably circular-cylindrical, in the region of the constriction. The cylindrical inner circumference of the upward motor space portion can extend, pointing axially away from the pump space, up to the motor space opening and preferably taper off cylindrically, forming the motor space opening. The motor space opening can be the largest cross-section, preferably circular cross-section, of the motor space. In advantageous embodiments, the motor space is only then constricted from the motor space opening to the pump space.

The housing structure can surround the pump space and the motor space as a contiguous housing space, such that when assembling the unit, the components of the pump can be inserted through the motor space opening and the motor space into the pump space. The inner circumference of the housing structure, which surrounds the pump space and the motor space in axial succession, can be successively constricted radially from the motor space opening up to and into the pump space and advantageously over the entire length of the pump space. In expedient embodiments, it is solely constricted progressively in the mounting direction from and including the motor space opening up to and including an axial end of the pump space, preferably in one or more stages, wherein the respective stage can be shaped as a step or in particular a ramp.

The stator centring structure exhibits a free outer circumference which the housing centring portion encompasses and centres in the fit. Within this context, "free outer circumference" means that the outer circumference in question freely points radially outwards before the pump-motor unit is assembled, i.e. on the stator itself, such that it can be moved directly into the fit with the housing centring portion. The free outer circumference can form the centring outer circumference of the stator already mentioned.

The centring outer circumference of the stator can advantageously overlap axially with the coils. It can surround more than one of the coils and in principle all of the coils. Not least for reasons of compactness, the housing centring portion advantageously encompasses and centres the centring outer circumference in an axial overlap with the coils of the electric drive motor in the fit. The centring outer circumference which is in the fit and is free until being mounted can in particular be the largest outer circumference of the stator, i.e. the outer circumference having the largest radial width. A large radial width of the circumferences which are in the centring fit is beneficial to preventing tilting movements during mounting.

If the stator comprises electrical coils and accordingly a coil core, the centring structure can be provided in a radial extension of the coil core. The centring structure can consist of the same material as the coil core. The centring structure can surround the coil core and can be immovably connected to the coil core. In such embodiments, the centring structure can consist of a different material than the coil core. More preferably, however, the coil core is extended radially outwards beyond the coils to such an extent that it simultaneously forms the centring structure and its outer circumference forms the centring outer circumference. In both embodiments, the centring outer circumference can surround an axial portion of the coil core, either as the outer circumference of a centring structure which is joined to the coil core or as the outer circumference of the coil core itself. In preferred embodiments, the centring outer circumference is an axial portion of the outer circumference of the coil core which faces away from the motor space opening, wherein the centring outer circumference extends up to an edge of the outer circumference of the coil core which faces away from the motor space opening. The centring outer circumference advantageously extends over less than 40% or less than 20% of the axial extent of the coil core, wherein the axial extent of the coil core is measured across all its parts in relation to the coil core only.

The stator can comprise multiple centring cams which are spaced from each other in the circumferential direction and protrude radially outwards in axial overlap with the coils. The centring cams can jointly form the stator centring structure. The centring cams can jointly and in particular solely form the centring outer circumference of the stator centring structure described above. A centring outer circumference which is interrupted in the circumferential direction and which is in the centring fit is conducive to accuracy of fit and can also form axial passages, for example for conducting the fluid to be delivered. As an alternative to or in addition to an optional fluid passage, one or more axial protrusions of the housing structure and/or another component arranged in the motor space, such as a pump space cover, can protrude in or through between two respectively adjacent centring cams, and/or accommodating space for one or more other components of the pump-motor unit can be gained.

The motor space can be constricted from the upward motor space portion to the housing centring portion, for example via a ramp. Expediently, however, a continuous and for example ramp-shaped constriction extends merely over a comparatively short axial length which is at least shorter than the axial length of the upward motor space portion and preferably also shorter than the axial length of the overlap between the housing centring portion and the stator centring structure. In principle, the motor space can instead be constricted abruptly, in the shape of steps, from the upward motor space portion to the housing centring portion.

In advantageous embodiments, the motor space is constricted only slightly at the transition from the upward motor space portion to the housing centring portion. The constriction is preferably embodied only as a centring step. A maximum width of the upward motor space portion is preferably at most 2% or at most 1% larger than a maximum width of the housing centring portion. Only a slight widening from the housing centring portion to the upward motor space portion is conducive to a compact design of the pump-motor unit.

The housing structure can comprise one or more other housing centring portions in the region of the motor space. Another, second housing centring portion can then extend axially either in front of or behind the housing centring portion which serves to centre the stator, as viewed from the motor space opening. A downward housing centring portion can extend behind the housing centring portion which serves to centre the stator, as viewed from the motor space opening, in order for example to centre a pump space cover.

The housing structure can comprise a housing end-facing wall and a housing circumferential wall which axially protrudes from the housing end-facing wall, wherein the housing circumferential wall forms the upward motor space portion and the housing centring portion. If, for example, the pump-motor unit comprises the pump space cover, then the pump space cover can be inserted into the housing structure and form an end-facing wall of the pump space and optionally also an end-facing wall of the motor space.

In developments, the housing circumferential wall which protrudes from the housing end-facing wall can form another housing centring portion, which is downward in relation to the mounting direction, axially between the housing centring portion and the housing end-facing wall, by constricting the motor space towards the downward housing centring portion in the direction of the housing end-facing wall. The motor space can then in particular be constricted from the housing centring portion which serves to centre the stator to the downward housing centring portion. Said other constriction to the downward housing centring portion can for example be abrupt, in the shape of a step or instead, as is preferred, in the shape of a ramp. The downward housing centring portion can advantageously serve to centre the pump space cover relative to the housing structure and can for this purpose enclose the pump space cover in a fit, such that the pump space cover is centred in relation to the rotational axis in a centring engagement with the downward housing centring portion. Advantageously, the pump space cover can axially abut the housing end-facing wall directly.

In the centring engagement between the pump space cover and the downward housing centring portion, a centring inner circumference of the downward housing centring portion encompasses a centring outer circumference of the pump space cover in a fit which is suitable for centring. The centring outer circumference of the pump space cover and the centring inner circumference of the downward housing centring portion can be adapted to each other such that in this centring engagement, a seal against the passage of fluid towards the motor space is obtained circumferentially around the rotational axis. A fit between the circumferences which are in the centring engagement can be selected in accordance with the fit between the stator centring structure and the housing centring portion which co-operates with it or can in principle also be selected to be wider. In order to perform a sealing function, however, it is more beneficial if the fit between the pump space cover and the downward housing centring portion is tighter than the fit between the stator centring structure and the housing centring portion which co-operates with it.

If the housing structure comprises one or more other centring portions, such as for example the centring portion for a pump space cover, the inner circumference of the housing structure is respectively constricted only slightly at the transition from an upward portion, which need not necessarily be a centring portion, to a downward centring portion in advantageous embodiments. Preferably, the constriction is respectively embodied only as a centring step. A maximum width of the respectively upward portion is preferably at most 2% or at most 1% larger than a maximum width of the next adjacently downward portion. A respectively only slight widening from the downward portion to the adjacently upward portion is conducive to a compact design of the pump-motor unit.

The upward motor space portion can be constricted once more axially between the motor space opening and the housing centring portion, which serves to centre the stator, towards said housing centring portion. This upward constriction can for example be abrupt, in the shape of a step or, as is preferred, in the shape of a ramp. The upward constriction can serve to centre a component of the pump-motor unit, for example a cooling and/or flow channelling structure, which is inserted into the motor space. The upward constriction can in particular be a constriction which is axially next to the motor space opening. The upward constriction need not however be produced to a tight fit with a component. It can instead serve to roughly guide the stator, i.e. pre-centre it so to speak, as it is inserted into the motor space through successively tighter cross-sections in the axial insertion direction, until it finally enters the centring fit with the associated housing centring portion.

If the motor space is viewed from the pump space axially towards the motor space opening, the upward constriction near the motor space opening correspondingly creates a widening towards the motor space opening. In the region of this widening, the motor space can be circumferentially smooth over its inner circumference and taper to form the motor space opening. A motor space cover can comprise a circumferential wall which protrudes axially from a base of the cover and protrudes into an inlet portion of the housing structure which is widened in this way and which comprises the motor space opening. The motor space can be sealed off from the outside environment of the motor-pump unit in the region of the axial overlap between the inlet portion of the housing structure and the circumferential wall of the cover, for example by means of a radial gasket which is circumferential around the rotational axis between the inlet portion and the circumferential wall of the cover.

The housing structure can consist of multiple sub-structures which are joined immovably to each other. More preferably, however, the housing structure is original-moulded in one piece. It can expediently be a metal casting or a plastic casting made of a heat-resistant plastic material. It can for example also be formed generatively.

The pump space can open into the motor space over its entire cross-section. This means that no housing structure which protrudes radially inwards beyond the pump space and could inhibit components of the pump from being mounted through the motor space opening, is provided axially between the pump space and the motor space.

In advantageous embodiments, the pump space is radially at most as wide as a minimum circumference of the motor space, in order to be able to insert the impeller and optionally other components of the pump into the pump space through the motor space opening and the motor space and arrange them in the pump space. The housing structure can be constricted from the motor space opening up to and into the pump space, preferably successively in multiple stages. One or more of these constrictions can be formed as a ramp, as already noted further above. One or more of the radial constrictions can however also be stepped.

In preferred embodiments, the respective constriction from a housing portion which is an upward portion in relation to the assembly direction to an immediately adjacent downward housing portion, in particular a housing centring portion, is shaped as a ramp. The respective ramp can be embodied in the shape of a rounded arc over its profile or can be expediently embodied linearly as an inclined ramp. In longitudinal sections, the respective ramp and the rotational axis of the rotor form an angle which is advantageously smaller than 60° or smaller than 50° over the entire profile of the ramp, such that the components which are to be arranged in the motor space or the pump space when assembling the pump-motor unit are not blocked axially by the respective constriction, if an automated mounting machine were to position and/or guide the respective component relative to the housing structure with less than 100% accuracy.

The pump-motor unit can comprise a motor space cover and a pump space cover for closing the motor space and the pump space. The motor space cover closes the motor space opening and is preferably detachably joined, for example screwed, to the housing structure. The pump space cover can be inserted into the housing structure and lie axially oppose the motor space cover, where it delineates the motor space, while axially delineating the pump space simultaneously.

In embodiments in which the pump-motor unit comprises a pump space cover which is inserted into the housing structure and forms an end-facing wall of the pump space and optionally also an end-facing wall of the motor space, the housing structure can comprise a housing end-facing wall and a housing circumferential wall which protrudes from the housing end-facing wall. This housing circumferential wall can form the motor space portion and the housing centring portion which serves to centre the stator and can terminate at an end face which faces away from the pump space, forming the motor space opening. The pump space cover can advantageously axially abut the housing end-facing wall from which the housing circumferential wall protrudes.

The housing structure can comprise a pump space base, which axially delineates the pump space, on a rear side which is axially distant from the motor space opening. In order to axially delineate the pump space, the housing of the unit can instead also comprise a detachable pump space cover. Preferably, however, the housing structure comprises an original-moulded pump space base.

The pump space comprises a delivery chamber in which the impeller is rotatably accommodated, and the housing comprises a low-pressure channel and a high-pressure channel which are each connected to the delivery chamber. When the impeller is rotationally driven, the fluid is delivered from the low-pressure channel into the delivery chamber and at an increased pressure via the delivery chamber to the high-pressure channel. The low-pressure channel and/or high-pressure channel can (each) emerge on a rear side of the housing which faces axially away from the motor space opening, such that a low-pressure port and/or a high-pressure port is/are formed on said rear side. In preferred embodiments, the low-pressure channel and the high-pressure channel each emerge axially on the relevant rear side of the housing, such that the pump-motor unit can be very easily connected in the axial direction to a supply and a discharge for the fluid. It is particularly advantageous if the low-pressure channel establishes an axially linear connection between the delivery chamber and the low-pressure port and/or the high-pressure channel establishes an axially linear connection between the delivery chamber and the high-pressure port.

In advantageous embodiments, the stator is axially fixed, i.e. arranged in the motor space such that it cannot be axially moved relative to the housing structure. The stator can for example be fixed by means of a screw connection and/or an adhesive connection and/or a welded connection. More preferably, however, it is held in the motor space in a force-fit clamping engagement by an axial clamping force via an axial abutment contact. In such embodiments, the stator is also preferably held in the motor space solely by the axial abutment contact. In the clamping engagement, an axial abutment which acts on an end-facing surface of the stator which axially faces the motor space opening presses the stator against an axial counter bearing which acts on an end-facing surface of the stator which faces axially away from the motor space opening. Clamping surfaces of the abutment and counter bearing which are in axial contact with the stator can be offset relative to each other in the circumferential direction and/or in the radial direction. More advantageously, however, pressure surfaces and complementary pressure surfaces formed by the abutment and the counter bearing lie opposite each other in an axial alignment, such that no tension or at most negligible tension is generated transversely with respect to the axial by the clamping engagement in the stator.

The abutment contact is preferably radially outwards from the coils. An abutment structure which forms the abutment at a free end face can axially overlap with the coils. It can in particular overlap axially, and for example only, with end windings of the coils which face the motor space opening.

In preferred embodiments, the stator centring structure not only serves to centre the stator but is also used for the clamping engagement, by introducing the clamping force into the stator centring structure, wherein the axial clamping force is also preferably introduced into the stator centring structure only, i.e. introduced into the stator via the stator centring structure only. In such a preferred embodiment, the stator is thus axially clamped further on the radially outer side than the coils in the region of the stator centring structure only.

A motor space cover which covers the motor space opening can in particular serve as a clamping structure and press the stator axially against the counter bearing and thus axially clamp it in the motor space. The counter bearing can be formed by a component of the pump-motor unit which is inserted into the housing structure and axially supported on the housing structure, preferably such that it cannot be axially moved, or by the housing structure itself. If a pump space cover is inserted into the housing structure and arranged axially between the motor space and the pump space and axially supported on the housing structure, the stator can advantageously be pressed axially against this pump space cover and thus axially clamped. The pump space cover can thus form the axial counter bearing.

A pump space cover which axially closes off the pump space can comprise a cover base and a circumferential wall which protrudes axially from the cover base into the motor space. The pump space cover can form a counter bearing for clamping the stator comprising multiple axially protruding counter bearing elements arranged in a distribution around the rotational axis of the rotor and/or a circumferential edge of such a circumferential wall which faces the stator. The circumferential wall can be continuously circumferential around the rotational axis of the rotor over at least most of the circumference or can be formed from multiple separate circumferential portions. The optional circumferential wall of the pump space cover and/or the multiple optional, axially protruding, discrete counter bearing elements can (each) overlap axially with the electric coils of the drive motor, wherein the circumferential wall and/or the counter bearing elements extend(s) radially outwards from the coils. The respective counter bearing structure, whether a circumferential wall or a discrete counter bearing element, can in particular overlap axially, and for example only, with end windings of the coils which face away from the motor space opening.

A motor space cover which closes the motor space opening can comprise a cover base and an inner circumferential wall which protrudes axially from the cover base into the motor space and/or an outer circumferential wall which protrudes axially from the cover base in a direction away from the motor space. The inner circumferential wall, if provided, and a circumferential edge which faces the stator can together form the abutment for clamping the stator. The inner circumferential wall, if provided, overlaps axially with the upward motor space portion, for example the inlet portion mentioned, wherein a gasket can be arranged in the region of the overlap in order to seal off the motor space opening. The inner circumferential wall, if provided, can overlap axially with the coils, in particular in embodiments in which it forms the abutment for clamping the stator. It can in particular overlap axially, and for example only, with end windings of the coils which face the motor space opening. The outer circumferential wall, if provided, can form a circumferential wall of an electronics space which is axially delineated by the cover base. Within this function, it can surround a control device for the electric drive motor, which is accommodated in the electronics space.

A rotational angular position in relation to the rotational axis can be predetermined for the stator. The rotational angular position can be predetermined in particular by a positioning engagement between the stator and a positioning structure, for example a positioning pin, which is based on a positive fit. The positioning structure can be immovably joined to the housing structure or can also be formed directly by the housing structure. If a pump space cover which delineates the pump space and the motor space is arranged in the housing structure, the pump space cover can comprise the positioning structure for the positioning engagement with the stator. In order to determine the rotational angular position of the pump space cover relative to the housing structure, the pump space cover can comprise another positioning structure. Alternatively, a positioning structure which is joined to the pump space cover and for example protrudes through the pump space cover can position the stator relative to the pump space cover in a first positioning engagement, and simultaneously position the pump space cover relative to the housing structure in a second positioning engagement, in relation to the rotational angular position. In such embodiments, the housing structure comprises a complementary structure, for example a recess in an end-facing wall, for the positioning engagement with the positioning structure of the pump space cover. In the positioning engagement, the stator is fixed relative to the pump space cover or directly relative to the housing structure in the circumferential direction. If there is a positioning engagement with the pump space cover, it is fixed relative to the housing structure in the circumferential direction in another positioning engagement with the housing structure.

In advantageous embodiments, the rotational angular position of the stator relative to the housing structure is determined by a positioning engagement between the positioning structure and the stator centring structure. In such developments, the stator centring structure serves not only to centre the stator but also to predetermine the rotational angular position of the stator.

The positioning structure can protrude towards the motor space opening, into the stator centring structure, and thus establish the positioning engagement in co-operation with the stator centring structure and determine a desired rotational angular position of the stator relative to the housing structure directly or via the pump space cover.

If the housing centring structure is formed by centring cams, which are spaced apart from each other in the circumferential direction as described above and protrude radially outwards to form the centring outer circumference of the stator, the positioning structure can protrude into the positioning engagement between two centring cams which are adjacent in the circumferential direction, in order to determine the rotational angular position of the stator. Centring cams which are adjacent in the circumferential direction and between which the positioning structure axially protrudes in the positioning engagement can taper in the axial direction such that they form a funnel-shaped opening or passage for the positioning structure in the axial direction. This enables or facilitates centring the stator in relation to the circumferential direction during assembly.

The stator centring structure can thus serve to centre the stator onto the rotational axis of the rotor of the drive motor and/or axially fix it, preferably axially clamp it solely on the basis of an abutment contact and/or determine the rotational angular position of the stator. Each of these three functions is advantageous in its own right and also in any combination of two. It is for example also advantageous to embody a stator centring structure which protrudes radially beyond the coils and does not perform the centring function claimed here but does serve to axially first the stator on the basis of an abutment contact by axially clamping it in conjunction with determining its rotational angular position. It is however particularly advantageous if it performs all three functions.

The pump-motor unit can be designed to be attached to an accommodating structure provided at an installation location and can comprise a mounting flange for fastening it for this purpose. It can also be embodied as an insertion pump and designed to be installed in an accommodating well of an accommodating structure. The accommodating structure can for example be a housing wall of a transmission and/or drive motor or clutch of a vehicle.

BRIEF DESCRIPTION OF THE DRAWINGS

The invention is described below on the basis of an example embodiment. Features disclosed by the example embodiment, each individually and in any combination of features, advantageously develop features of the claims and the embodiments described above. There is shown:

DETAILED DESCRIPTION OF THE INVENTION

Figures 1, 2:
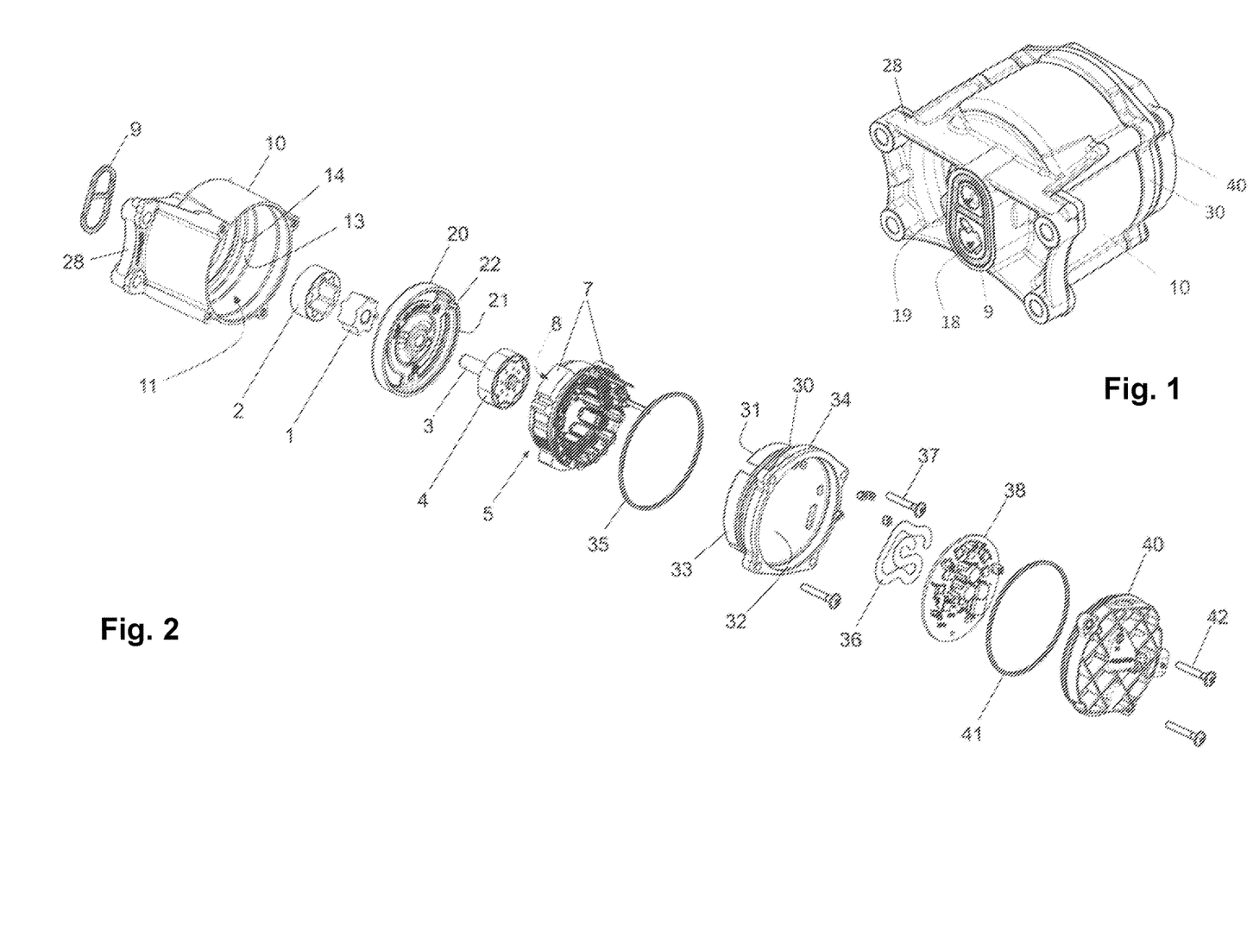
FIG. 1 a pump-motor unit in the assembled state in an isometric view.
FIG. 2 components of the pump-motor unit lined up in an isometric view along a central axis.

FIG. 1 shows a pump-motor unit when mounted, in a view onto an end-facing side on which a low-pressure channel 18 and a high-pressure channel 19 emerge next to each other in an axial direction. The low-pressure channel 18 forms a low-pressure port of the pump-motor unit where it emerges, and the high-pressure channel 19 forms a high-pressure port of the pump-motor unit where it emerges. A gasket 9 on the end-facing side serves to seal off the two ports from each other and from the outside environment when the unit is connected to a corresponding fluid supply and fluid discharge. If the unit is arranged in a fluid cycle, for example a transmission oil cycle, working oil cycle, lubricant cycle and/or coolant cycle of a vehicle, it suctions a fluid to be delivered, for example a transmission oil and/or engine lubricating oil and/or cooling liquid and/or working oil, via the low-pressure port while the pump is in operation and discharges it at an increased pressure via the high-pressure port.

The pump-motor unit comprises a mounting flange 28 using which it can be fastened to an accommodating structure provided at the installation location, for example a housing wall of a transmission or drive motor or clutch of a vehicle. Because the low-pressure port and high-pressure port are alignment axially and arranged in the region of the mounting flange 28, fastening the pump-motor unit simultaneously also establishes the connection to the fluid cycle. It is also advantageous for mounting at the installation location if the low-pressure port and the high-pressure port lie directly next to each other. This also facilitates sealing them off using just one gasket 9.

In the isometric view of FIG. 2, the components of the pump-motor unit are lined up sequentially along a mounting axis for assembling the unit. The low-pressure channel 18 and the high-pressure channel 19 (FIG. 1) emerge, parallel to the mounting axis, on the end-facing side of the pump-motor unit which is the rear end-facing side in FIG. 2.

The pump-motor unit comprises a pump featuring a first impeller 1 and a second impeller 2 and an electric drive motor comprising a rotor 4 and a stator 5. The pump is an internally toothed wheel pump, wherein the impeller 1 is an externally toothed inner impeller and the impeller 2 is an internally toothed hollow wheel. Internally toothed wheel pumps are compact and robust. In principle, however, the pump can instead be embodied as an externally toothed wheel pump or vane pump, to name but a couple of examples of pump designs which can alternatively be used. It is preferably embodied as a rotary pump comprising at least one rotationally driven impeller. The electric drive motor can for example be a brushless DC motor, and the stator 5 can comprise electric coils 6 in a distribution over the circumference, as for example in the example embodiment. Other electric motor designs can however also be used instead.

The components of the pump, such as in particular the impellers 1 and 2, and the components of the electric motor, such as in particular the rotor 4 and the stator 5, are arranged in a common housing and thus form the unit together with the housing.

The housing comprises a housing structure 10, a pump space cover 20, a motor space cover 30 and an electronics cover 40. The housing structure 10 comprises a circumferential wall which surrounds a motor space for accommodating the electric motor 4, 5 and terminates in a motor space opening 11 on an end-facing side. The housing structure 10 also comprises the mounting flange 28.

Figure 3:
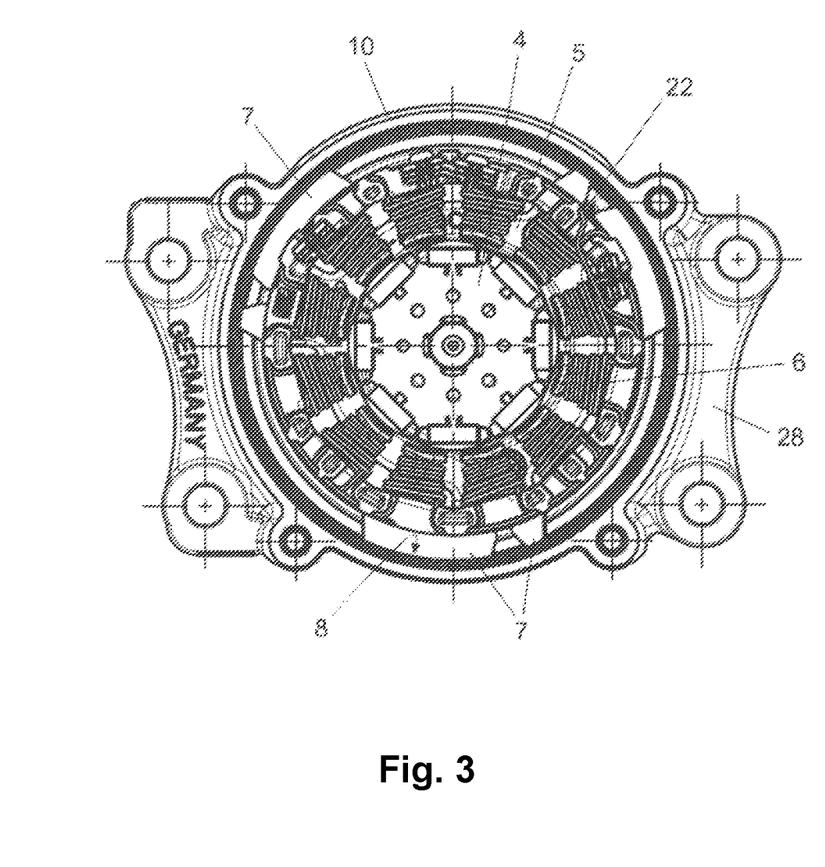
FIG. 3 an axial view into a motor space of the pump-motor unit.
Figure 4:
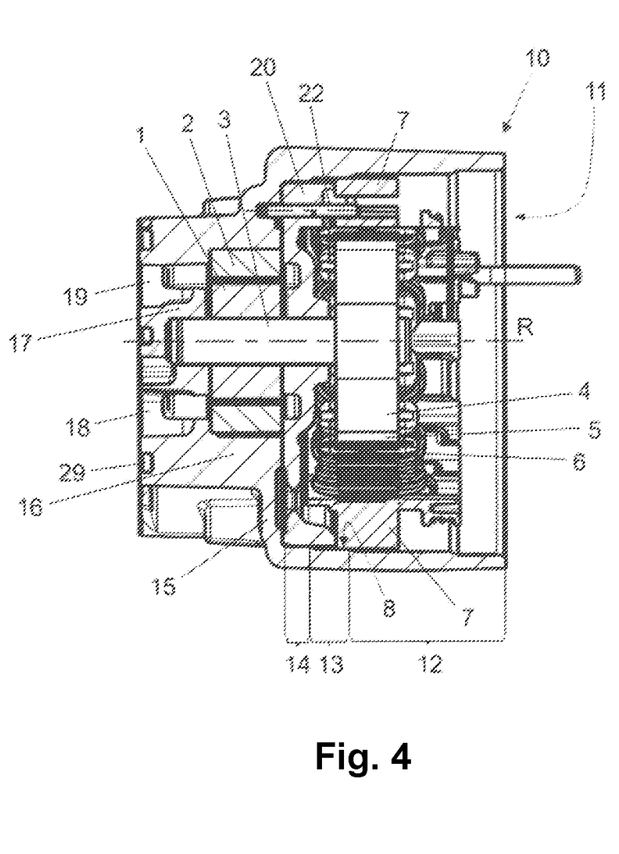
FIG. 4 the not yet fully assembled pump-motor unit in a first longitudinal portion.

In FIGS. 3 and 4, the impellers 1 and 2 of the pump, the pump space cover 20 and the rotor 4 and stator 5 of the drive motor are inserted into the housing structure 10. The motor space opening 11 on the end-facing side is not yet closed.

The impellers 1 and 2 are accommodated in a pump space. The housing structure 10 comprises a pump space portion 16 which surrounds the pump space. On an end-facing side of the pump space which is distant from the motor space opening 11, the housing structure 10 forms a pump space base 17 which axially delineates the pump space on said end-facing side. The pump space cover 20 delineates the pump space on its other end-facing side nearer the motor space opening 11. The pump space cover 20 separates the pump space from the motor space. The low-pressure channel 18 and the high-pressure channel 19 extend through the pump space base 17, each preferably axially and linearly, and emerge axially on the outer end-facing side of the pump space base 17, forming the respective fluid port. The gasket 9 is an axial gasket which is pressed axially against the accommodating structure provided at the installation location of the pump-motor unit, in order to perform its sealing function. The pump space base 17 can comprise a gasket groove 29 on its outer end-facing side for accommodating the gasket 9.

Figure 5:
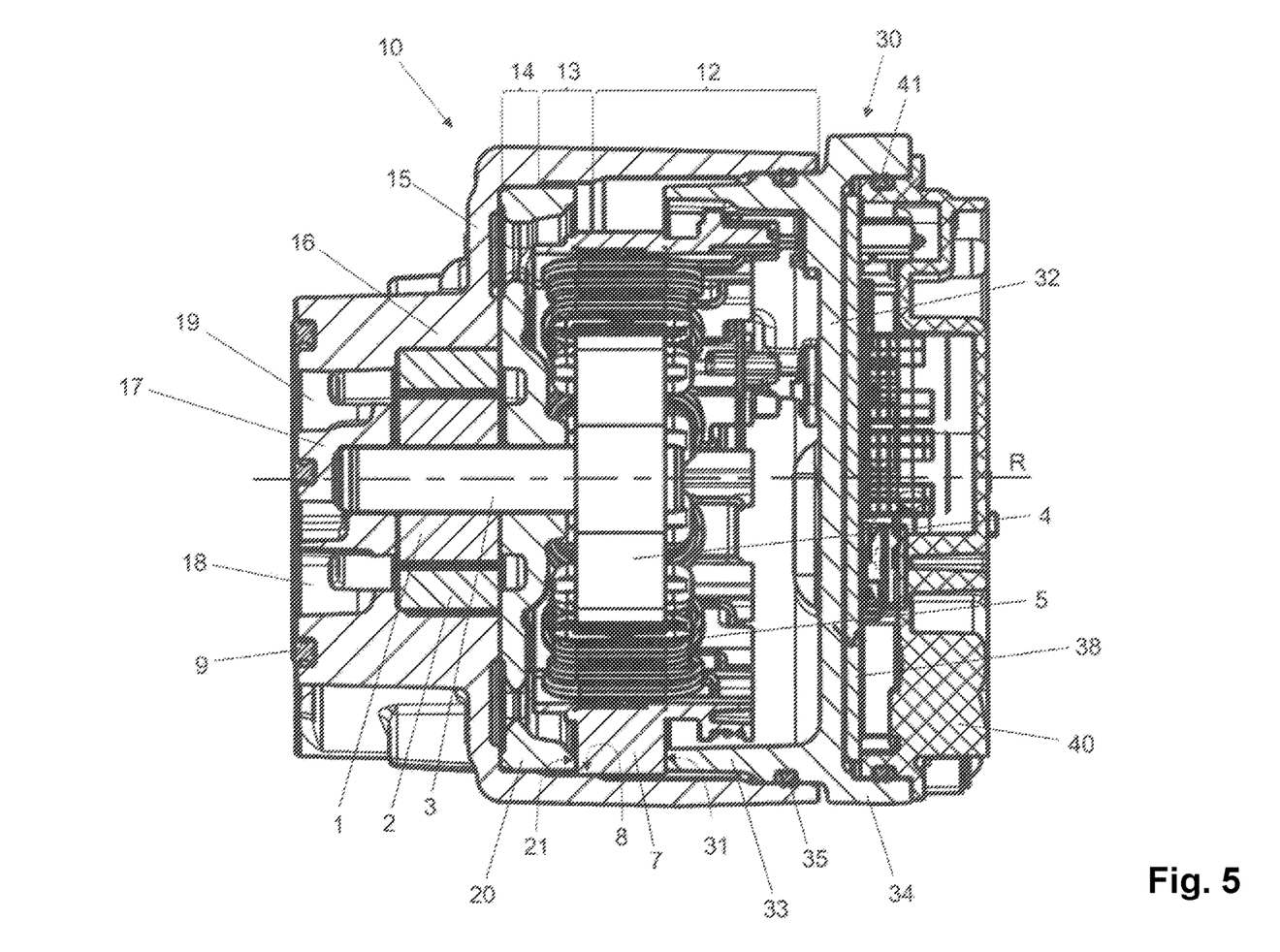
FIG. 5 the fully assembled pump-motor unit in a second longitudinal portion.

FIG. 5 shows the pump-motor unit when fully assembled. The motor space cover 30 closes the motor space opening 11 and thus the motor space on the relevant end-facing side in a fluid-tight seal. The electronics cover 40 is fastened to the motor space cover 30. The covers 30 and 40 together enclose an electronics space in which an electronic control device 38 for controlling and/or regulating the drive motor 4, 5 is accommodated.

The motor space cover 30 comprises a plate-shaped cover base 32, an inner circumferential wall 33 which protrudes axially from the cover base 32 into the housing structure 10, and an outer circumferential wall 34 which protrudes axially towards the other side. The electronics cover 40 protrudes into the outer circumferential wall 34 of the motor space cover 30 and, together with the motor space cover 30, encloses the electronics space. A radial gasket 41 which is arranged between the outer circumferential wall 34 and a circumferential wall of the electronics cover 40 which lies opposite on the radially inner side seals off the electronics space from the outside environment of the pump-motor unit. Electrical connectors for the drive motor 4, 5 and the control device 38 are guided outwards through the electronics cover 40.

The rotor 4 and the stator 5 are accommodated in the motor space. A circumferential wall of the housing structure 10 surrounds the motor space. The pump space cover 20 delineates the motor space on the end-facing side near the pump space, and the motor space cover 30 delineates the motor space on its end-facing side which lies axially opposite the pump space cover 20.

The impeller 1 and the rotor 4 are each non-rotatably connected to a drive shaft 3 which extends axially from the rotor 4 through the pump space cover 20 into the pump space. The housing structure 10 and the pump space cover 20 each form a rotational slide bearing for the drive shaft 3, which is thus supported on both sides of the impellers 1 and 2. When the pump-motor unit is assembled, the impeller 1, the drive shaft 3 and the rotor 4 form a rotational unit which can be rotated about a rotational axis R. The rotational axis R coincides with the mounting axis of the pump-motor unit.

In order to centre the stator 5 in relation to the rotational axis R, the stator 5 comprises a stator centring structure 7 and the housing structure 10 comprises a housing centring portion 13. The stator centring structure 7 protrudes axially into the housing centring portion 13 in a tight radial fit. The fit can in particular be selected such that even when the axial overlap between the stator centring structure 7 and the housing centring portion 13 is small and the rotational axis R is horizontal, the stator 5 is held in its installation position without additional fastening means, as long as only the inherent weight of the stator 5 is acting. In advantageous embodiments, the length of the centring engagement is at most 10%, more preferably at most 5%, of a maximum radial width of the stator centring structure 7. In the centring engagement, the fit can in particular be a clearance fit having at most a small clearance or a transition fit. If the centring engagement between the stator centring structure 7 and the housing centring portion 13 is realised using a transition fit, the dimensions of the fit are selected such that at most a small axial force is required in order to move the stator 5 axially into and out of the fit.

The centring engagement is provided between a centring outer circumference 8 of the stator centring structure 7 and a centring inner circumference of the housing structure 10, which encloses the centring outer circumference 8 in a tight fit. In order to form the housing centring portion 13 together with its centring inner circumference, the inner circumference of the housing structure 10 and thus the motor space is constricted from a motor space portion 12, which is near the motor space opening 11 and is an upward portion in relation to the mounting direction when assembling the pump-motor unit, to the housing centring portion 13. It is constricted by an axially short, radially flat ramp.

The constriction towards the housing centring portion 13, preferably in the shape of a ramp, can for example be as long as the housing centring portion 13, but is more preferably shorter than the housing centring portion 13 and approximately stepped. The housing centring portion 13 can for example be more than twice or more than three times as long as the axial extent of the constriction. The axial extent of the constriction is advantageously also shorter than the length of the centring engagement. The centring engagement can for example be at least 50% longer than the constriction.

The centring outer circumference 8 of the centring structure 7 and the centring inner circumference of the housing centring portion 13 which is in the fit with it are preferably cylindrical and can in particular be circular-cylindrical. The centring structure 7 can exhibit a cylindrical, preferably circular-cylindrical outer circumference over its entire axial length, wherein said outer circumference axially and linearly extends the centring outer circumference 8. The housing centring portion 13 can be cylindrical, preferably circular-cylindrical, in an axially linear extension of its centring inner circumference. The inner circumference of the motor space portion 12 is preferably cylindrical and can in particular be circular-cylindrical. Another cylindrical cross-sectional shape, for example a polygonal or flattened oval cross-section, can however also instead be implemented for the inner circumference of the motor space portion 12 and/or the centring inner circumference of the housing centring portion 13 and, in accordance with these, for the centring outer circumference 8.

The radial extent of the constriction from the upward motor space portion 12 to the housing centring portion 13 can be very small. The constriction preferably only performs the function of centring the stator in a defined way in the motor space by way of a tight fit. The motor space portion 12 is exactly wide enough in the region directly in front of the constriction towards the housing centring portion 13 that the stator 5 can be moved axially in a straight line, without touching the housing structure 10, up to and into the overlap with the housing centring portion 13. A maximum width of the housing centring portion 13 can for example be at least 90% or at least 95% or at least 97% of a maximum width of the motor space portion 12 in the region directly in front of the constriction.

In principle, the constriction towards the housing centring portion 13 and/or the housing centring portion 13 itself can be formed by multiple protrusions, for example multiple axial ribs, which are only formed locally and which are spaced apart from each other in the circumferential direction in a distribution around the rotational axis R. More preferably, however, the inner circumference of the housing structure 10 and thus the motor space is constricted continuously and fully circumferentially around the rotational axis R towards the housing centring portion 13. The inner circumference is preferably circumferentially smooth around the rotational axis R over the length of the housing centring portion 13.

The centring outer circumference 8 can advantageously be an outer circumference of a coil core of the stator 5. In the example embodiment, the centring outer circumference 8 is a strip of the outer circumference of the coil core which faces away from the motor space opening 11 and extends slightly from a circumferential edge of the coil core on the end-facing side towards the motor space opening 11. The coil core is axially more than three times or more than four times as wide as said circumferential strip which forms the centring outer circumference 8.

In the centring engagement, i.e. within the centring fit between the stator centring structure 7 and the housing centring portion 13, the stator 5 is pushed up to and against an axial counter bearing 21. The pump space cover 20 forms the counter bearing 21. For the axial abutment contact, the stator centring structure 7 comprises an abutment surface on an end-facing side which faces the pump space. To form the counter bearing 21, the pump space cover 20 comprises an end-facing surface which faces the stator centring structure 7 and which the abutment surface of the stator centring structure 7 abuts. The abutment surface of the stator centring structure 7 and/or the complementary surface of the counter bearing 21 which is in abutment contact with it can (each) be planar radial surfaces. This applies in particular to the abutment surface of the stator centring structure 7. The abutment contact can be fully and continuously circumferential around the rotational axis R, but is more advantageously delineated locally and at only a number of points in a distribution around the rotational axis R, wherein the points of contact are distributed such that this abutment contact also counteracts and preferably prevents tilting movements of the stator 5 when the stator centring structure 7 abuts the counter bearing 21 in a loose abutment contact in the centring fit.

The stator 5 comprises multiple centring cams 7 in a distribution around the rotational axis R, wherein said centring cams 7 protrude radially outwards and together form the stator centring structure 7. The centring cams 7 are clearly visible in FIGS. 2 and 3. The centring cams 7, together with their outer circumference, form the centring outer circumference 8 (FIG. 2) of the stator 5. The rear end-facing surfaces of the centring cams 7, which are covered in FIG. 2, are the abutment surfaces of the stator 5 for the axial abutment contact with the counter bearing 21. Providing the stator centring structure 7 in the form of these discrete centring cams 7 already ensures that the axial abutment contact with the counter bearing 21 is only local in a distribution around the rotational axis R.

Providing the centring cams 7 which are spaced apart from each other in the circumferential direction and in this sense discrete is advantageous for centring, since it counteracts misalignments of the stator 5 in relation to centring. It also reduces the circumferential surface of the centring outer circumference 8 which as to be produced for the fit. The centring cams 7 are distributed over the circumference in such a way that the position of the stator 5 is determined radially with respect to the rotational axis R by the centring engagement.

The centring cams 7 or multiple groups of centring cams 7 can be distributed around the rotational axis R at equal angular intervals. The stator centring structure 7 advantageously comprises at least three centring cams 7 which are spaced apart from each other in the circumferential direction.

The stator 5 is axially fixed in the motor space by a clamping engagement. In the clamping engagement, the stator 5 is pressed axially against the counter bearing 21 by means of an axial abutment 31. The abutment 31 acts on an end-facing surface of the stator centring structure 7 which axially faces the motor space opening, i.e. in the example embodiment, it acts on multiple end-facing surfaces of the centring cams 7 which are spaced apart from each other and distributed around the rotational axis R. The stator 5 is axially fixed solely on the basis of a pressure contact between the stator centring structure 7 and the abutment 31 and, counteracting it, the counter bearing 21.

The motor space cover 30 can form the abutment 31. If the motor space cover 30 forms the abutment 31, the stator 5 is axially fixed, i.e. fixed such that it cannot be moved axially relative to the housing structure 10, when the motor space cover 30 is mounted. Axially fixing the stator 5 solely by clamping directly between the covers 20 and 30 helps to simplify the housing structure 10. Together with the housing end-facing wall 15, the housing structure 10 provides the axial counter bearing for the pump space cover 20. Forming a counter bearing especially for the stator 5, in addition to the housing end-facing wall 15, can be omitted on the part of the housing structure 10.

The stator centring structure 7 also performs another function, by defining a rotational angular position for the stator 5 in co-operation with a positioning structure 22 which can be seen in FIGS. 2, 3 and 4. The positioning structure 22 protrudes from the pump space cover 20 into the motor space. In the example embodiment, it protrudes through the pump space cover 20 and from the pump space cover 20 axially into a recess in the housing structure 10, for example the housing end-facing wall 15. The positioning structure 22 thus also determines the rotational angular position of the pump space cover 20 relative to the housing structure 10. When the pump-motor unit is assembled, the positioning structure 22 protrudes into an axial overlap with the stator centring structure 7. In the positioning engagement which can be seen in FIGS. 3 and 4, the positioning structure 22 protrudes into a gap which remains between two adjacent centring cams 7 in the circumferential direction and which exhibits a width as measured in the circumferential direction which is adapted to the positioning structure 22. The positioning structure 22 can for example be pin-shaped.

The stator centring structure 7 comprises multiple groups, preferably three groups, of two centring cams 7 each, in a distribution over the circumference of the stator 5. This can be seen in FIGS. 2 and 3. The two centring cams 7 of each group are respectively separated from each other in the circumferential direction by a gap, the width of which is selected in accordance with the positioning structure 22, while a gap which is comparatively wider in the circumferential direction respectively remains between the centring cams 7 of adjacent groups. The groups of centring cams 7 are distributed over the circumference at equal angular intervals. Centring is optimised by providing the stator centring structure 7 as three centring cams 7 which are formed around the rotational axis R at the same angular interval from each other. The stator 5 can also be positioned in three different rotational angular positions relative to the housing structure 10 in accordance with the alternating current phases.

The housing structure 10 comprises another housing centring portion 14 in the region of the motor space. This other housing centring portion 14 serves to centre the pump space cover 20 in relation to the rotational axis R. The motor space is constricted from the housing centring portion 13 to said other housing centring portion 14, wherein the constriction can in particular be shaped as a ramp.

The preferably ramp-shaped constriction towards the other housing centring portion 14, which is a downward portion in the mounting direction, can for example be as long as the downward housing centring portion 14, but is more preferably shorter than the housing centring portion 14 and at least approximately stepped. The housing centring portion 14 can for example be more than twice or more than three times as long as the axial extent of said downward constriction. The axial extent of the downward constriction is advantageously shorter than the length of the centring engagement between the pump space cover 20 and the housing centring portion 14. The centring engagement can for example be at least 50% longer than the downward constriction.

The inner circumference of the downward housing centring portion 14 is preferably cylindrical and can in particular be circular-cylindrical. Other cylindrical cross-sectional shapes, for example a polygonal or flattened oval cross-section, can however also instead be implemented for the housing centring portion 14.

The radial extent of the constriction from the housing centring portion 13 to the downward housing centring portion 14 can be very small. The constriction preferably only performs the function of centring the pump space cover 20 in the motor space. The housing centring portion 13 can for example be exactly wide enough radially that the pump space cover 20 can be moved axially in a straight line, without touching the housing structure 10, up to and into the overlap with the housing centring portion 14. A maximum width of the downward housing centring portion 14 can for example be at least 90% or at least 95% or at least 97% of a maximum width of the housing centring portion 13.

In principle, the constriction towards the downward housing centring portion 14 and/or the housing centring portion 14 itself can be formed by multiple protrusions, for example multiple axial ribs, which are only formed locally and which are distributed around the rotational axis R and spaced apart from each other in the circumferential direction. More preferably, however, the inner circumference of the housing structure 10 and thus the motor space is constricted continuously and fully circumferentially around the rotational axis R towards the housing centring portion 14. The inner circumference of the housing structure 10 is preferably circumferentially smooth around the rotational axis R over the length of the downward housing centring portion 14.

At its other end near the motor space opening 11, the motor space widens to form a slightly widened inlet portion. The free axial end of the inlet portion surrounds the motor space opening 11. As can be seen in FIG. 5, the inner circumferential wall 33 of the motor space cover 30 protrudes into the motor space portion 12 which is an upward portion in relation to the mounting direction. In the region of the inlet portion, the motor space is sealed off from the outside environment of the pump-motor unit by means of a radial gasket 35 which surrounds the inner circumferential wall 33 of the motor space cover 30. The inner circumferential wall 33 protrudes through the inlet portion and into the part of the motor space portion 12 behind it, but terminates in its abutment 31, axially slightly short of the housing centring portion 13.

The pump space and the motor space, and preferably also the electronics space, are axially arranged sequentially along the rotational axis R and coaxially with respect to each other in relation to the mounting axis and rotational axis R. The pump space cover 20 is completely accommodated in the housing structure 20 and axially abuts the housing end-facing wall 15 which forms an intermediate base of the housing structure 10.

The electric drive motor 4, 5 is embodied as a wet rotor. The motor space is connected to the pump space. This connection can for example be implemented via the rotational slide bearing formed by the pump space cover 20 and/or via a connecting channel which extends through the pump space cover 20. The fluid delivered by the pump thus serves as a coolant for the electric drive motor 4, 5.

The motor space cover 30 separates the electronics space from the motor space. Lines can be guided through the motor space cover 30 which connect the drive motor, in this case the stator 5, to the control electronics 38 in order to control and/or regulate it and supply it with electrical energy. The electronics space is preferably sealed off from the motor space by means of the motor space cover 30 in order to prevent fluid from entering the electronics space.

The housing structure 10 can be manufactured in an original-moulding method, for example by being cast, or generatively. In principle, however, it can instead also be joined together from multiple separately formed parts.

The housing structure 10 comprises, next to each other, the pump space portion 16 via which it surrounds the pump space, and a motor space portion which axially adjoins the pump space portion 16. The pump space base 17 and the pump space portion 16 which axially protrudes circumferentially from the pump space base 17 form a first cup-shaped axial portion of the housing structure 10. The housing structure 10 widens radially from the pump space portion 16 to the motor space, forming the housing end-facing wall 15. The housing end-facing wall 15 and the circumferential wall of the motor space which protrudes axially from it form a second cup-shaped axial portion of the housing structure 10. At its end which faces axially away from the housing end-facing wall 15, the second axial portion terminates in an opening, thus forming the motor space opening 11.

Starting from the motor space opening 11, the motor space portion comprises the upward motor space portion 12, axially adjoining it via the constriction the housing centring portion 13 for the stator 5, and adjoining that via the downward constriction the downward housing centring portion 14 for the pump space cover 20. For its part, the upward motor space portion 12 comprises the inlet portion which forms the motor space opening 11 at its upward end and, adjoining it via an upward constriction, a second motor space portion which is constricted at its downward end towards the housing centring portion 13 for the stator 5. The downward housing centring portion 14 transitions into the housing end-facing wall 15, i.e. the housing end-facing wall 15 directly adjoins the housing centring portion 14. The pump space opens into the motor space, axially level with the housing front wall 15.

A particularly advantageous feature of the housing structure 10 is that it is constricted successively in respectively stages in the mounting direction from the motor space opening 11 axially towards the pump space and, in the example embodiment, axially up to the pump space base 17. Advantageously, it is respectively constricted over the entire circumference, i.e. fully and continuously circumferentially over 360° around the rotational axis R. The upward constriction from the inlet portion to the comparatively constricted remaining portion of the upward motor space portion 12 and/or the constriction from the upward motor space portion 12 to the housing centring portion 13 and/or the downward constriction towards the other housing centring portion 14 can each in particular be shaped as a ramp, wherein in advantageous embodiments, the respective ramp-shaped constriction extends over only a short axial length and is thus stepped, so to speak. Lastly, the interior space surrounded by the housing structure 10 is constricted from the motor space to the comparatively tighter pump space via the housing end-facing wall 15.

The design of the pump-motor unit and the shape of the housing structure 10 enable its components to be mounted easily but still precisely. Efficiently mounting the components can involve the following steps.

In a first step, the pump space cover 20 is pushed onto the drive shaft 3. The drive shaft 3 is already non-rotatably joined to the rotor 4. The impeller 1 is then joined to the drive shaft 3 such that the impeller 1 and the rotor 4 are each non-rotatably connected to the drive shaft 3 and the pump space cover 20 is arranged between the impeller 1 and the rotor 4.

In a second step, the impeller 2 is moved through the motor space opening 11 and the motor space and inserted into the pump space. The sub-assembly consisting of the impeller 1, the drive shaft 3, the rotor 4 and the pump space cover 20 is then inserted through the motor space opening 11 in the mounting direction, such that the impeller 1 enters into toothed engagement with the impeller 2, and the pump space cover 20 abuts the housing end-facing wall 15. As it is inserted, the pump space cover 20 is centred on the associated housing centring portion 14. As can be seen in FIG. 4, the rotational angular position of the pump space cover 20 is determined by means of the positioning structure 22, such that the pump space cover 20 axially abuts the housing end-facing wall 15 or at least lies axially in front of it, centred, in the rotational angular position which is predetermined in this way.

In a third step, the stator 5 is inserted in the mounting direction via the motor space opening 11. As it is axially inserted, the stator centring structure 7 enters into the positioning engagement with the positioning structure 22 and into the centring engagement with the associated housing centring portion 13. The stator 5, which is centred in relation to the rotational axis R and positioned in relation to the rotational angular position, is moved axially into abutment with the pump space cover 20, i.e. with its counter bearing 21.

In a fourth step, the motor space opening 11 is closed by means of the motor space cover 30, wherein the motor space cover 30 is positioned such that the front end of its inner circumferential wall 33 (the abutment 31) axially lies directly opposite the stator centring structure 7 and is preferably already in axial contact with the stator centring structure 7. The gasket 35 is then expediently in sealing contact with the housing structure 10 and seals off the motor space.

In a fifth step, the motor space cover 30 can be joined, preferably braced, to the housing structure 10. The joining connection is selected such that the abutment 31 of the motor space cover 30 is pressed against the stator centring structure 7 with a certain pressing force in order to fix the stator 5 with an axial clamping force between the abutment 31 and the counter bearing 21 of the pump space cover 20. The motor space cover 30 is expediently joined to the housing structure 10 by means of a screw connection. In such embodiments, the fastening means 37 are screw fastening means.

In a sixth step, the control device 38 is arranged on the outer side of the cover base 32 of the motor space cover 30. This step involves establishing the electrical connection between the control device 38 and the stator 5 and can involve arranging a heat-conducting pad 36 or a heat-conducting paste 36 on the cover base 32 or on an end-facing surface of the control device 38 which faces the cover base 32 beforehand.

In a seventh step, the electronics cover 40 is attached to the motor space cover 30 and joined to it, for example by means of fastening means 42 such as for example screw connection means.

The inlet portion of the housing structure 10 can not only serve to seal off the motor space in co-operation with the motor space cover 30 but also perform a first positioning and/or guiding function for the components which are to be consecutively inserted. The adjoining, constricted part of the motor space portion 12 can serve to position and guide, with comparatively more radial precision, the pump space cover 20 and/or the stator 5, which can be more exactly pre-centred, so to speak, when they are moved further within the portion 12. The housing centring portion 13 can be used to even more precisely pre-centre the pump space cover 20. When shaped as a ramp, the respective constriction further improves pre-centring.

The joining connection between the housing structure 10 and the motor space cover 30 is preferably releasable. The joining connection between the motor space cover 30 and the electronics cover 40 is preferably releasable. In advantageous embodiments, these two joining connections are selected such that one or the other can optionally be released and it is not necessary to remove the electronics cover 40 beforehand in order to release the motor space cover 30. Particularly advantageously, the axially nested design and the assembly of the pump-motor unit do not involve a material-fit connection. This avoids tedious mounting steps in addition to assembling the components and in principle also allows the components to be easily disassembled.

REFERENCE SIGNS 1 impeller
2 impeller
3 drive shaft
4 rotor
5 stator
6 coils
7 stator centring structure
8 centring outer circumference
9 gasket
10 housing structure
11 motor housing opening
12 motor space portion
13 housing centring portion
14 housing centring portion
15 housing end-facing wall
16 pump space portion
17 pump space base
18 low-pressure channel
19 high-pressure channel
20 pump space cover
21 counter bearing
22 positioning structure
23 —
24 —
25 —
27 —
28 mounting flange
29 gasket groove
30 motor space cover
31 abutment
32 cover base
33 circumferential wall
34 circumferential wall
35 gasket
36 gasket
37 fastening means
38 control device
39 —
40 electronics cover
41 gasket
42 fastening means
R rotational axis

The invention claimed is:

1. A pump-motor unit, comprising:
a housing structure which surrounds a pump space and a motor space in axial alignment with the pump space;
an impeller for delivering a fluid, which can be rotated in the pump space;
an electric drive motor which is accommodated in the motor space and comprises a rotor, which can be rotated about a rotational axis, and a stator comprising a stator centring structure, wherein the stator comprises electric coils and a coil core which protrudes through the coils; and
a drive shaft which couples the impeller to the rotor in order to rotationally drive the impeller; and
a pump space cover which is inserted into the housing structure and forms an end-facing wall of the pump space;
wherein the housing structure comprises a pump space portion which radially delineates the pump space, a motor space portion which radially delineates the motor space, a housing centring portion which lies axially between the pump space portion and the motor space portion and radially delineates the motor space, and a motor space opening on an end-facing side, through which the rotor and the stator can be axially inserted into the motor space when assembling the pump-motor unit,
wherein the housing centring portion and the motor space portion surround the stator, and the housing centring portion overlaps axially with the stator centring structure,
wherein the motor space is constricted from the motor space portion to the housing centring portion,
wherein the housing centring portion surrounds the stator centring structure in a centring engagement exhibiting a fit, such that the stator is centred in relation to the rotational axis by the co-operation between the stator centring structure and the housing centring portion,
wherein the housing structure comprises a housing end-facing wall and a housing circumferential wall which protrudes from the housing end-facing wall and forms the motor space portion, the housing centring portion and another housing centring portion axially between the housing centring portion and the housing end-facing wall,
wherein the motor space is constricted towards the other housing centring portion in a direction of the housing end-facing wall,
wherein the other housing centring portion surrounds the pump space cover in a fit, such that the pump space cover is centred in relation to the rotational axis in co-operation with the other housing centring portion, and
wherein the stator centring structure comprises a centring outer circumference, and the housing centring portion comprises a centring inner circumference; the centring inner circumference and the centring outer circumference overlap each other axially in the fit and together form the centring engagement; and the centring engagement extends over an axial length of at most 10% of a radial width of the centring outer circumference and/or less than 20% of an overall length of the stator as measured axially over all its parts.

2. The pump-motor unit according to claim 1, wherein the centring outer circumference surrounds at least some of the coils and is enclosed in the centring fit by the housing centring portion in a radial overlap with the coils.

3. The pump-motor unit according to claim 2, wherein the centring outer circumference enclosed in the fit is the largest outer circumference of the stator.

4. The pump-motor unit according to claim 1, wherein the stator comprises multiple centring cams which are spaced apart from each other in a circumferential direction and protrude radially outwards and overlap with the coils and jointly form the stator centring structure.

5. The pump-motor unit according to claim 1, wherein the pump space opens axially into the motor space, and the impeller can be inserted into the pump space through the motor space opening and the motor space.

6. The pump-motor unit according to claim 1, wherein the housing structure comprises a pump space base, which axially delineates the pump space, on a rear side which is axially distant from the motor space opening.

7. The pump-motor unit according to claim 1, wherein the pump space comprises a delivery chamber in which the impeller is rotatably accommodated, and the housing structure comprises a low-pressure channel and a high-pressure channel which are each connected to the delivery chamber in order to deliver the fluid from the low-pressure channel to the high-pressure channel when the impeller is rotationally driven, and wherein the low-pressure channel and/or the high-pressure channel emerge(s) on a rear side of the housing structure which faces axially away from the motor space opening, thus forming a low-pressure port and/or a high-pressure port.

8. The pump-motor unit according to claim 1, wherein the housing circumferential wall terminates at the end-facing wall of the pump space to form the motor space opening.

9. The pump-motor unit according to claim 8, wherein the pump space cover forms also an end-facing wall of the motor space and axially abuts the housing end-facing wall.

10. The pump-motor unit according to claim 1, wherein the housing structure comprises a pump space base on a rear side which is axially distant from the motor space opening, and the pump space cover is inserted into the housing structure axially between the motor space opening and the pump space base, wherein the pump space base and the pump space cover delineate the pump space on its two end-facing sides and each rotatably support the drive shaft.

11. The pump-motor unit according to claim 1, wherein the stator is held in the motor space in a force fit by means of an axial clamping force via an axial abutment contact.

12. The pump-motor unit according to claim 11, wherein the axial clamping force is introduced into the stator centring structure.

13. The pump-motor unit according to claim 1, wherein the motor space comprises a motor space cover which covers the motor space opening and presses the stator axially against a counter bearing, thus axially clamping the stator in the motor space via an abutment contact.

14. The pump-motor unit according to claim 1, wherein the pump space cover is arranged axially between the motor space and the pump space and axially supported on the housing structure, wherein the pump space cover forms an axial counter bearing for the stator, against which the stator is pressed axially and thus clamped.

15. The pump-motor unit according to claim 1, wherein a positioning structure which cannot be moved in relation to the housing structure is in a positioning engagement with the stator centring structure, and a rotational angular position of the stator relative to the housing structure is determined by the positioning engagement.

16. The pump-motor unit according to claim 1, wherein the fit between the housing centring portion and the stator centring structure is a clearance fit or a transition fit which is selected such that the stator can be moved into and out of the fit by an axial force.

17. The pump-motor unit according to claim 16, wherein the fit between the housing centring portion and the stator centring structure is a clearance fit, having a clearance which is tactilely imperceptible.

18. The pump-motor unit according to claim 1, wherein the motor space is constricted from the motor space portion to the housing centring portion in the shape of a ramp.

19. A pump-motor unit, comprising:
   a housing structure which surrounds a pump space and a motor space in axial alignment with the pump space;
   an impeller for delivering a fluid, which can be rotated in the pump space;
   an electric drive motor which is accommodated in the motor space and comprises a rotor, which can be rotated about a rotational axis, and a stator comprising a stator centring structure, wherein the stator comprises electric coils and a coil core which protrudes through the coils; and
   a drive shaft which couples the impeller to the rotor in order to rotationally drive the impeller; and
   a pump space cover which is inserted into the housing structure and forms an end-facing wall of the pump space;
   wherein the housing structure comprises a pump space portion which radially delineates the pump space, a motor space portion which radially delineates the motor space, a housing centring portion which lies axially between the pump space portion and the motor space portion and radially delineates the motor space, and a motor space opening on an end-facing side, through which the rotor and the stator can be axially inserted into the motor space when assembling the pump-motor unit,
   wherein the housing centring portion and the motor space portion surround the stator, and the housing centring portion overlaps axially with the stator centring structure,
   wherein the motor space is constricted from the motor space portion to the housing centring portion, and
   wherein the housing centring portion surrounds the stator centring structure in a centring engagement exhibiting a fit, such that the stator is centred in relation to the rotational axis by the co-operation between the stator centring structure and the housing centring portion,
   wherein the housing structure comprises a housing end-facing wall and a housing circumferential wall which protrudes from the housing end-facing wall and forms the motor space portion, the housing centring portion and another housing centring portion axially between the housing centring portion and the housing end-facing wall,
   wherein the motor space is constricted towards the other housing centring portion in a direction of the housing end-facing wall,
   wherein the other housing centring portion surrounds the pump space cover in a fit, such that the pump space cover is centred in relation to the rotational axis in co-operation with the other housing centring portion,
   wherein the housing structure comprises an inlet portion which forms the motor space opening and which is widened in a view from the pump space axially towards the motor space opening, such that a motor space cover is centred in relation to the rotational axis by the inlet portion when inserted into the housing structure.

* * * * *